(12) United States Patent
Gandhasri (10) Patent No.: US 7,979,701 B1
(45) Date of Patent: Jul. 12, 2011

(54) CROSS MAPPING GRAPHICAL INTERFACE TO SHOW ENCRYPTION RELATIONSHIPS BETWEEN HOSTS AND STORAGE DEVICES

(75) Inventor: Rajamohan Gandhasri, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 976 days.

(21) Appl. No.: 11/532,480

(22) Filed: Sep. 15, 2006

(51) Int. Cl.
*H04L 29/06* (2006.01)

(52) U.S. Cl. ............... 713/165; 726/6; 726/22

(58) Field of Classification Search ............... 713/165; 726/6, 22
See application file for complete search history.

(56) References Cited

U.S. PATENT DOCUMENTS

| | | |
|---|---|---|
| 4,521,871 A | 6/1985 | Galdum et al. |
| 4,829,297 A | 5/1989 | Ilg et al. |
| 4,876,664 A | 10/1989 | Bittorf et al. |
| 4,937,777 A | 6/1990 | Flood et al. |
| 5,193,189 A | 3/1993 | Flood et al. |
| 5,287,548 A | 2/1994 | Flood et al. |
| 5,627,745 A | 5/1997 | Flood |
| 5,678,042 A | 10/1997 | Pisello et al. |
| 5,777,874 A | 7/1998 | Flood et al. |
| 5,819,028 A | 10/1998 | Manghirmalani et al. |
| 5,819,292 A | 10/1998 | Hitz et al. |
| 5,912,814 A | 6/1999 | Flood |
| 5,933,347 A | 8/1999 | Cook et al. |
| 5,948,110 A | 9/1999 | Hitz et al. |
| 5,950,225 A | 9/1999 | Kleiman |
| 5,956,715 A * | 9/1999 | Glasser et al. ............ 1/1 |
| 5,963,448 A | 10/1999 | Flood et al. |
| 5,963,962 A | 10/1999 | Hitz et al. |
| 5,966,300 A | 10/1999 | Flood et al. |
| 5,966,301 A | 10/1999 | Cook et al. |
| 5,966,304 A | 10/1999 | Cook et al. |
| 5,997,166 A | 12/1999 | Flood |
| 6,038,570 A | 3/2000 | Hitz et al. |
| 6,049,775 A | 4/2000 | Gertner et al. |
| 6,119,244 A | 9/2000 | Schoenthal et al. |
| 6,138,126 A | 10/2000 | Hitz et al. |
| 6,233,600 B1 | 5/2001 | Salas et al. |
| 6,320,585 B1 | 11/2001 | Engel et al. |
| 6,346,954 B1 | 2/2002 | Chu et al. |
| 6,430,711 B1 | 8/2002 | Sekizawa |
| 6,505,256 B1 | 1/2003 | York |
| 6,633,912 B1 | 10/2003 | Welter et al. |
| 7,107,534 B1 | 9/2006 | de Jong et al. |
| 7,523,187 B1 * | 4/2009 | Lavallee et al. ............ 709/223 |
| 2003/0088658 A1 * | 5/2003 | Davies et al. ............ 709/223 |
| 2003/0191938 A1 * | 10/2003 | Woods et al. ............ 713/165 |

* cited by examiner

*Primary Examiner* — Jason K Gee (74) *Attorney, Agent, or Firm* — Cesari and McKenna, LLP (57) ABSTRACT

The invention operates in connection with a secure storage compartment feature of a storage security appliance to allow users to see the encryption and permission relationships between hosts and storage in one view. The invention also provides a user tool that enables users to manage secure storage compartments (encryption/key relationship) easily and access permissions between them. The invention also provides a user tool that helps users find missing relationships/permissions easily when troubleshooting a host's missing storage after a storage security appliance is installed. The invention further provides a user tool that overlays cross mapping/relationship information on top of a topology view, thereby making it easy for a user to see missing or extraneous relationships between hosts and storage.

11 Claims, 6 Drawing Sheets

CROSS MAPPING GRAPHICAL INTERFACE TO SHOW ENCRYPTION RELATIONSHIPS BETWEEN HOSTS AND STORAGE DEVICES

BACKGROUND OF THE INVENTION

1. Technical Field

The invention relates to data encryption. More particularly, the invention relates to cross mapping a graphical interface to show encryption relationships between hosts and storage devices.

2. Description of the Prior Art

The advantages of networked data storage technologies such as Network Attached Storage (NAS) and Storage Area Networks (SAN) are well established, but storing an organization's data on a network creates significant security risks. Technologies, such as NAS and SAN, that aggregate data in a storage network can improve scalability, manageability, and access to critical data, while substantially reducing the total cost of storage. Additionally, storage networks can simplify the process for enterprises seeking to implement comprehensive disaster recovery programs. However, data in networked storage environments is significantly more vulnerable to unauthorized access, theft, or misuse than data stored in more traditional, direct-attached storage. Aggregated storage is not designed to compartmentalize the data it contains, and data from different departments or divisions becomes co-mingled in the network. Data backup, off-site mirroring, and other disaster recovery techniques increase the risk of unauthorized access from people both inside and outside the enterprise. Partner access through firewalls and other legitimate business needs also create undesirable security risks. With storage networks, a single security breach can threaten the data assets of an entire organization.

Technologies such as firewalls, Intrusion Detection Systems (IDS), and Virtual Private Networks (VPN) seek to secure data assets by protecting the perimeter of the network. While important in their own right, these targeted approaches do not adequately secure storage. Consequently, they leave data within the network itself dangerously open to both internal and external attacks. Once these barriers are breached, e.g. via stolen passwords, uncaught viruses, or simple misconfiguration, data assets are fully exposed.

It is known to secure networked storage by protecting data both in transit and stored on disk. The Decru DataFort™ product (Decru, Redwood City, Calif.; see FIG. 1) is an example of an encryption appliance, referred to as a storage security appliance, that fits transparently into NAS, SAN, and other environments, securely encrypting and decrypting data at wire-speed. Because such devices are built specifically to secure data storage, storage security appliances combine high-performance hardware with comprehensive key management, thus creating a powerful, yet manageable security solution. Storage security appliances are typically application-independent, vendor-agnostic, and fit seamlessly into the existing network infrastructure. With a secure storage security appliance enterprises can fully leverage the benefits of networked storage, confident that their data assets are secure.

Typical storage security appliances use secure storage compartments in the storage security appliance to compartmentalize data within a storage device, so users from one workgroup cannot access data belonging to another unless explicitly authorized to do so. Data in each secure storage compartment can be encrypted using a different key, thus providing for separation.

In connection with this feature of a storage security appliance, it would be advantageous if users could see the encryption and permission relationships between hosts and storage in one view.

It would be further advantageous if a user tool were available that enabled users to manage secure storage compartments (encryption/key relationship) easily and access permissions between them.

It would also be advantageous if a user tool were provided that helped users find missing relationships/permissions easily when troubleshooting a host's missing storage after a storage security appliance is installed.

It would also be advantageous to provide a user tool that could overlay cross mapping/relationship information on top of a topology view, thereby making it easy for a user to see missing or extraneous relationships between hosts and storage.

SUMMARY OF THE INVENTION

The presently preferred embodiment of the invention operates in connection with a secure storage compartment feature of a storage security appliance, such as the Cryptainer® vaults in the Decru DataFort™ storage security appliance, to allow users to see the encryption and permission relationships between hosts and storage in one view. The invention also provides a user tool that enables users to manage secure storage compartments (encryption/key relationship) easily and access permissions between them. The invention also provides a user tool that helps users find missing relationships/permissions easily when troubleshooting a host's missing storage after a storage security appliance is installed. The invention further provides a user tool that overlays cross mapping/relationship information on top of a topology view, thereby making it easy for a user to see missing or extraneous relationships between hosts and storage.

This embodiment of the invention simplifies configuration of a storage security appliance so it can be installed and deployed faster. The invention also helps isolate and fix access to storage problems easily and quickly. It is less error prone than previous approaches because it displays overall topology and overlaid cross mapping.

The presently preferred embodiment of the invention visually presents the encryption relationships and access permissions between hosts and storage. When a host is selected, the invention presents a view to the user that shows all the secure storage compartments and corresponding logical unit numbers (LUNs—a unique number that identifies a specific logical unit) it can access in a SAN topology page. When a secure storage compartment presented in the view is selected by a user, it shows the hosts that can access it and its LUN. Similarly, when a LUN is selected it shows what secure storage compartment it belongs to and which host accesses it. The same functionality is available between hosts and pools for tape products in a tape management page. This functionality also works at the group level to show the relationships between host groups and secure storage compartment groups.

DETAILED DESCRIPTION OF THE INVENTION

Figure 1:
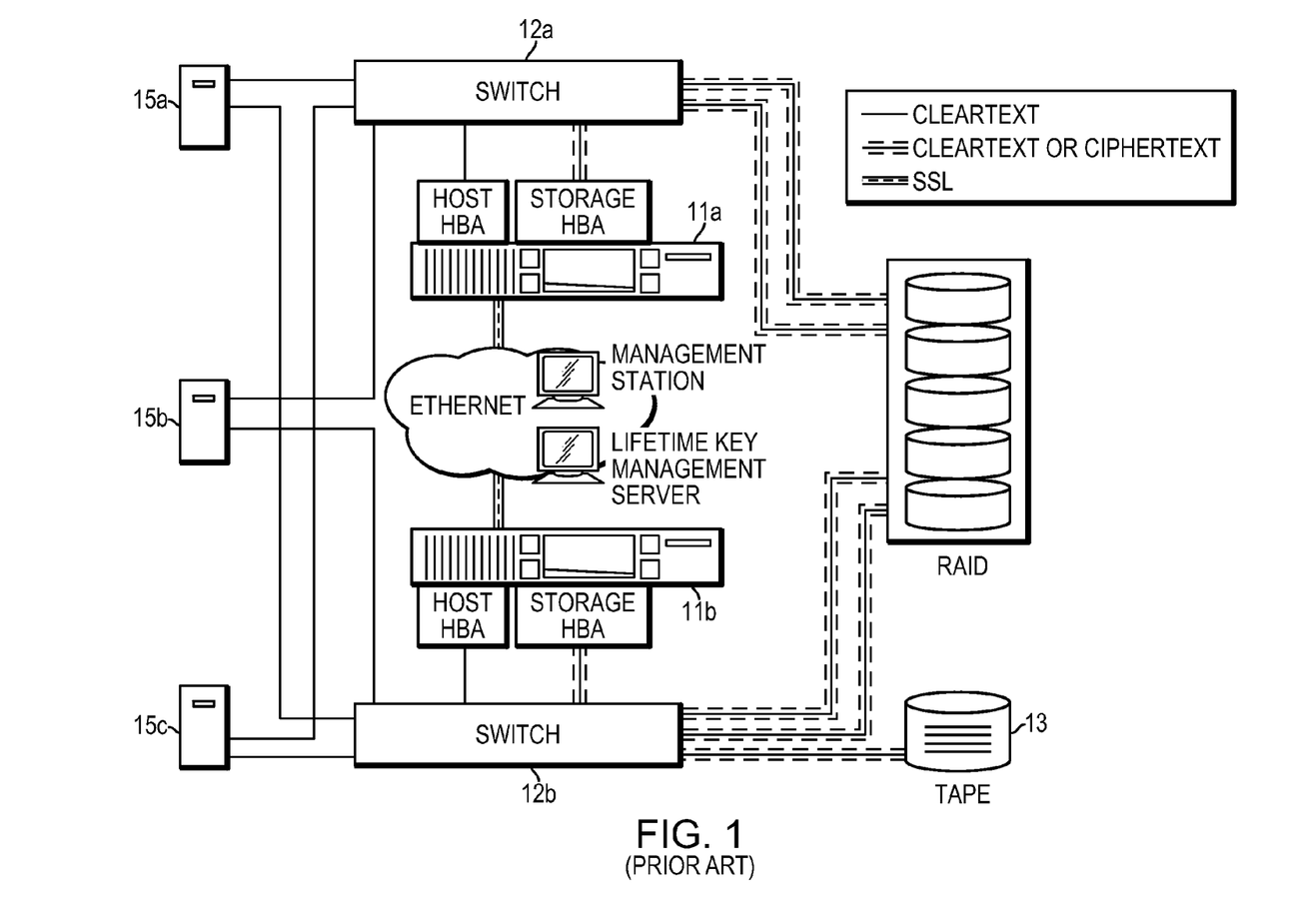
FIG. 1 is a block schematic diagram that illustrates a storage security appliance cluster with two switches sending encrypted and cleartext data to tape.

FIG. 1 is a block schematic diagram that illustrates a storage security appliance cluster with two switches 12a, 12b sending encrypted and cleartext data to tape 13. By encrypting data, and routing all access through secure hardware, the storage security appliance 11a, 11b makes it easier for organizations to control and track data access between storage media 13 and attached servers 15a-15c. Encryption effectively blocks all back doors to data, thus protecting sensitive information on disk or tape against theft or misuse. Even if an unauthorized person gains access to the media, they only see meaningless characters.

The invention operates within a known architecture, such as is shown in FIG. 1 and, in particular, operates in connection with a secure storage compartment feature of a storage security appliance, such as the Cryptainer® vaults in the Decru DataFort™, to allow users to see the encryption and permission relationships between hosts and storage in one view. The invention also provides a user tool that enables users to manage secure storage compartments (encryption/key relationship) easily and access permissions between them. The invention also provides a user tool that helps users find missing relationships/permissions easily when troubleshooting a host's missing storage after a storage security appliance is installed. The invention further provides a user tool that overlays cross mapping/relationship information on top of a topology view, thereby making it easy for a user to see missing or extraneous relationships between hosts and storage.

An exemplary embodiment of the invention simplifies configuration of a storage security appliance so it can be installed and deployed faster. The invention also helps isolate and fix access to storage problems easily and quickly. It is less error prone than previous approaches because it displays overall topology and overlaid cross mapping.

The presently preferred embodiment of the invention visually presents the encryption relationships and access permissions between hosts and storage. When a host is selected, the invention presents a view to a user (e.g. an administrator or a user with appropriate administrative privileges) that shows all the secure storage compartments and corresponding logical unit numbers (LUNs—a unique number that identifies a specific logical unit) it can access in a SAN topology page. When a secure storage compartment presented in the view is selected by a user, it shows the hosts that can access it and its LUN. Similarly when a LUN is selected, it shows what secure storage compartment it belongs to and which host accesses it. The same functionality is available between hosts and pools for tape products in a tape management page. This functionality also works at the group level to show the relationships between host groups and secure storage compartment groups.

Figure 2:
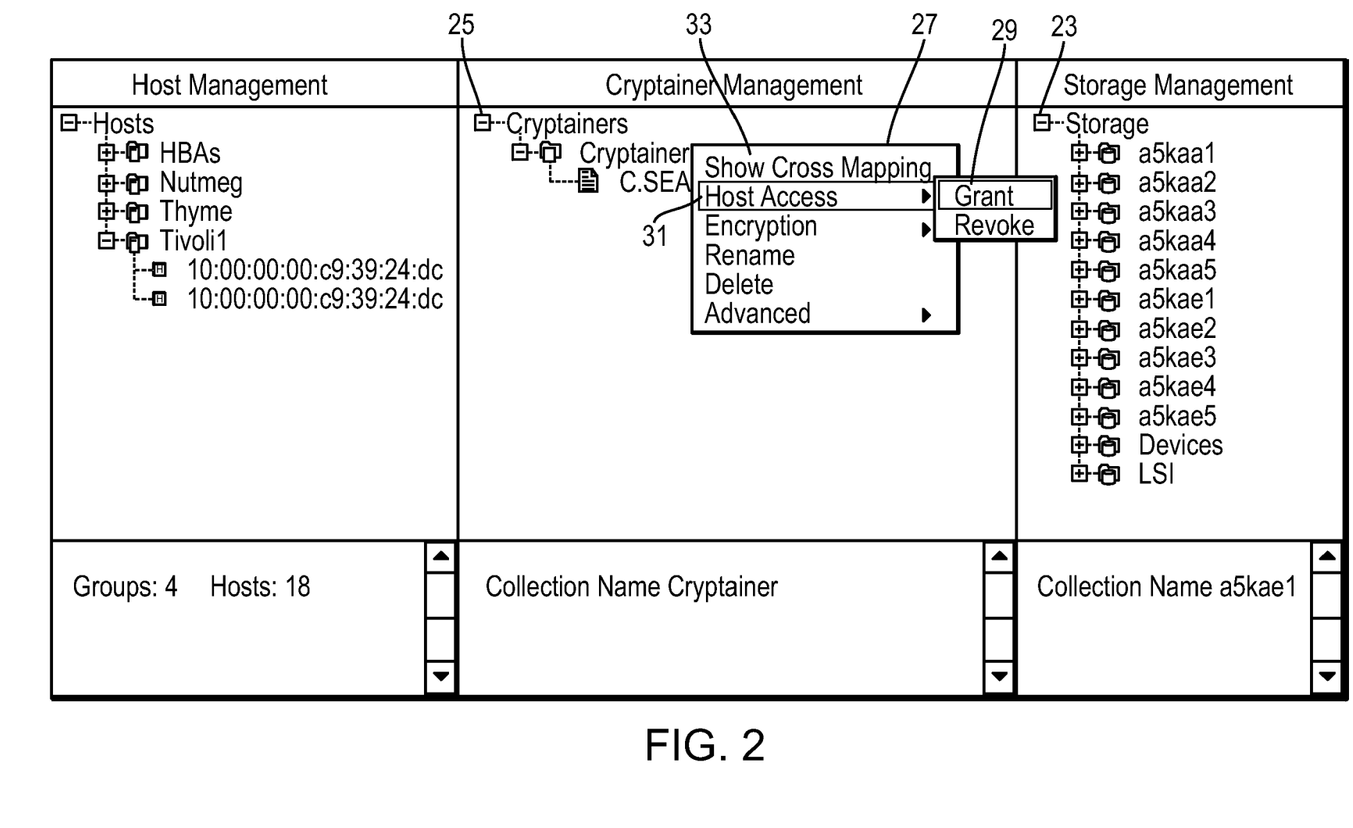
FIG. 2 is a screen shot of cross mapping in a graphical interface to show encryption relationships between hosts and storage devices or backup pools according to the invention.

FIG. 2 is a screen shot of cross mapping in a graphical interface to show encryption relationships between hosts and storage devices or backup pools according to the invention. It should be appreciated that the interface may be graphical, such as a graphical user interface (GUI) or other suitable interface. FIG. 2 shows a SAN topology, but those skilled in the art will appreciate that the invention is readily applicable to NAS and other topologies. As shown in FIG. 2, in connection with the storage security appliance, the graphical interface application retrieves a complete list of hosts 21, storage devices 23, keys with regard to secure storage compartments (referred to as "cryptainers" on FIGS. 2-6) 25 from the storage security appliance to display a topology page. It also retrieves the information to overlay cross mapping/encryption relationships between the selected hosts and its storage devices onto the topology view. The invention works similarly for managing hosts and pools in a tape management page.

To access the features of the invention, a user must have administrative ability to use the system, as evidenced by a security card, (e.g. a smartcard) or a password. Once the user is authenticated to the system, the invention provides a way to look at the relationships between devices, logical and virtual, on the network, and also manage the relationships between the devices from a single view.

One key feature of the invention provides a view showing a grouping of the hosts in the system. This aspect of the invention groups all of the hosts into a single view (FIGS. 2-6) and also groups all the corresponding secure storage compartments and storage devices into a single view. In this way, a user can manage a group of hosts that, in turn, is connected to a group of storage devices, where data are stored in secure storage compartments. The invention allows a user to grant permissions at the group level and then cross-map groups. In this way, group level permissions, for example, for a group of hosts, can be viewed as a mapping to those storage devices for which said permissions are granted to the group of hosts. Different host groups will map to different storage devices depending upon their granted permissions; and different groups of storage devices are accessible, based upon permission and host group memberships. Thus, if the user wants to view a host group, and then executes a cross mapping command, the invention provides a corresponding view to the user. If all LUNs under a corresponding group are accessible, then the invention provides a view that indicates this fact. Otherwise, a different indication is provided. In this way, a user can easily see, for example, which LUN has access to a particular host. Thus, in the preferred embodiment, the user can highlight all LUNs in the network to provide a complete view of all storage security appliance clusters and all secure storage compartments, as well as manage each of these network elements.

Those skilled in the art will appreciate that, while the invention herein is discussed in connection with a storage security appliance, which is the presently preferred embodiment of the invention, the invention is readily applicable to any other system that lends itself to cross mapping a graphical interface to show encryption relationships between hosts and storage devices or backup pools. The discussion herein in connection with storage security appliances is provided only as a non-limiting example of an exemplary implementation of the invention. While the following discussion references operation of a storage security appliance it is not intended to serve as a limitation of the invention's scope.

Following are a descriptions of operations that may be performed from the graphical interface.

Operations

Assign Permissions to a Secure Storage Compartment

Select a collected host and then right-click a secure storage compartment. A pop-up menu 27 is displayed. Select Host access (31)>Grant from an associated pop-up sub-menu 29. The associated host collection has access to the secure storage compartment.

Figure 3:
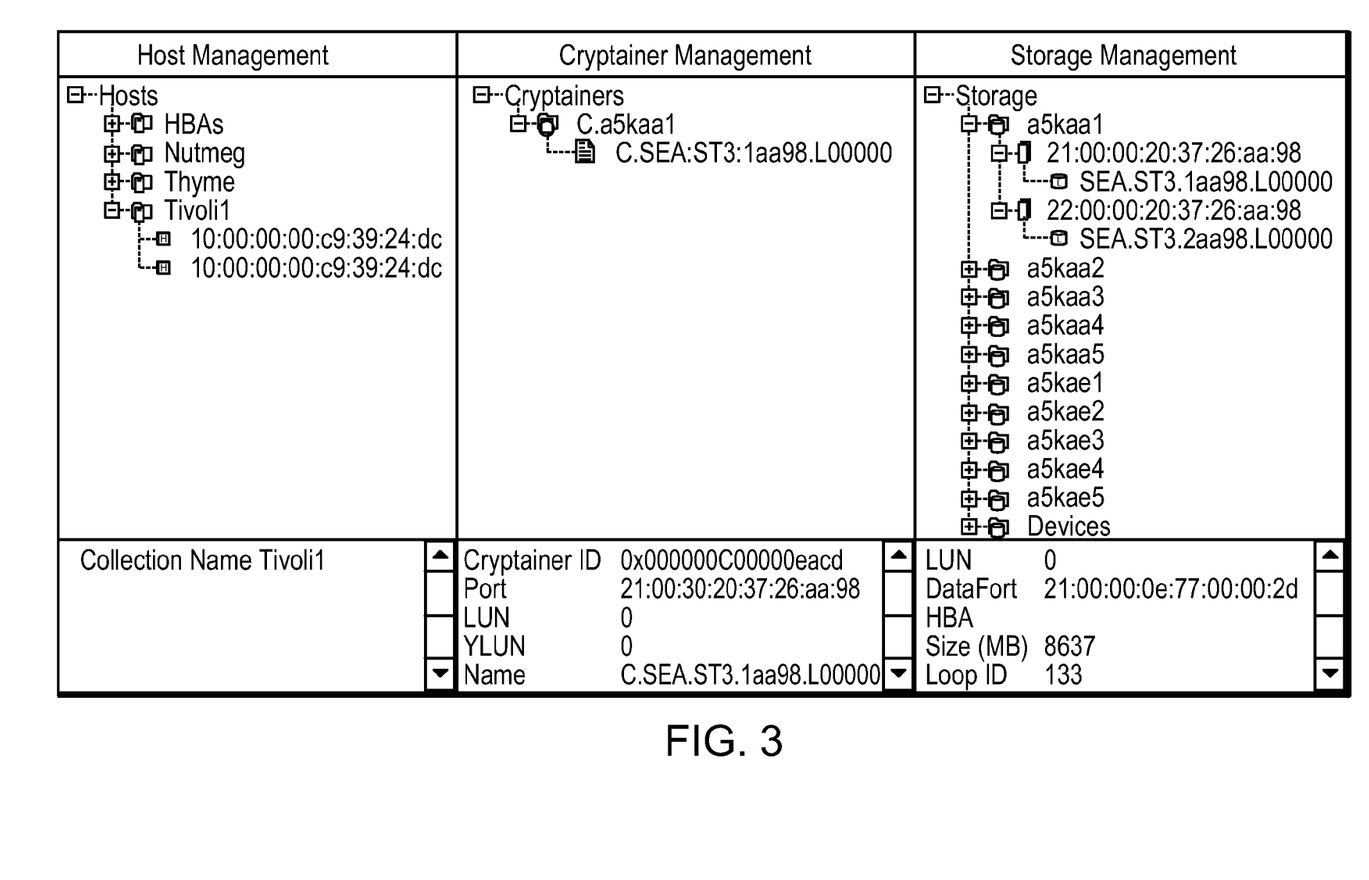
FIG. 3 is a screen shot of cross mapping in a graphical interface to show encryption relationships between hosts and storage devices or backup pools in which bold text indicates the storage location of a secure storage compartment and which host has access according to the invention.

To view the results, right-click the secure storage compartment and select Show Cross Mapping 33 (FIG. 3). Bold text indicates the storage location of the secure storage compartment and which host has access.

Storage Collection Menu

Figure 4:
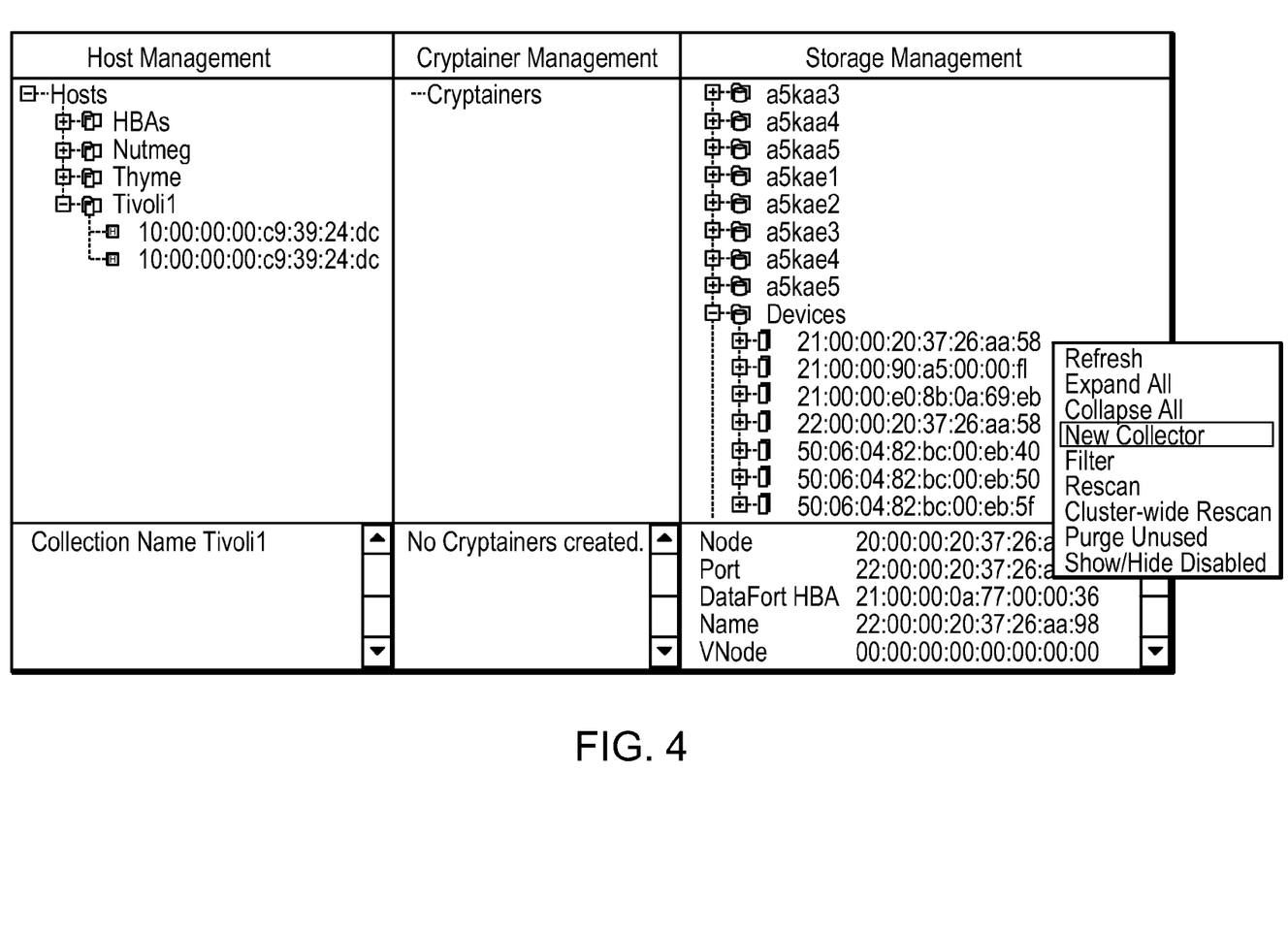
FIG. 4 is a screen shot of cross mapping in a graphical interface to show encryption relationships between hosts and storage devices or backup pools, showing a view of the storage collection menu according to the invention.

Right-click a storage device collection to view the storage collection menu (FIG. 4). Use this menu to manage collected storage devices.

Create secure storage compartments. Create a secure storage compartment on the device (a secure storage compartment per LUN for the entire device). Use Port Mapping if the LUN assignment structure must be consistent with the physical configuration of the device. Use LUN Mapping if the storage device is a multi-target device such as a JBOD, or group of disks.

Rename Select Rename. The name field opens in the lower pane. Enter the new name. To save the change, leave the cursor in the name field and hit Return on the Management Station keyboard.

Host Collection Menu

Figure 5:
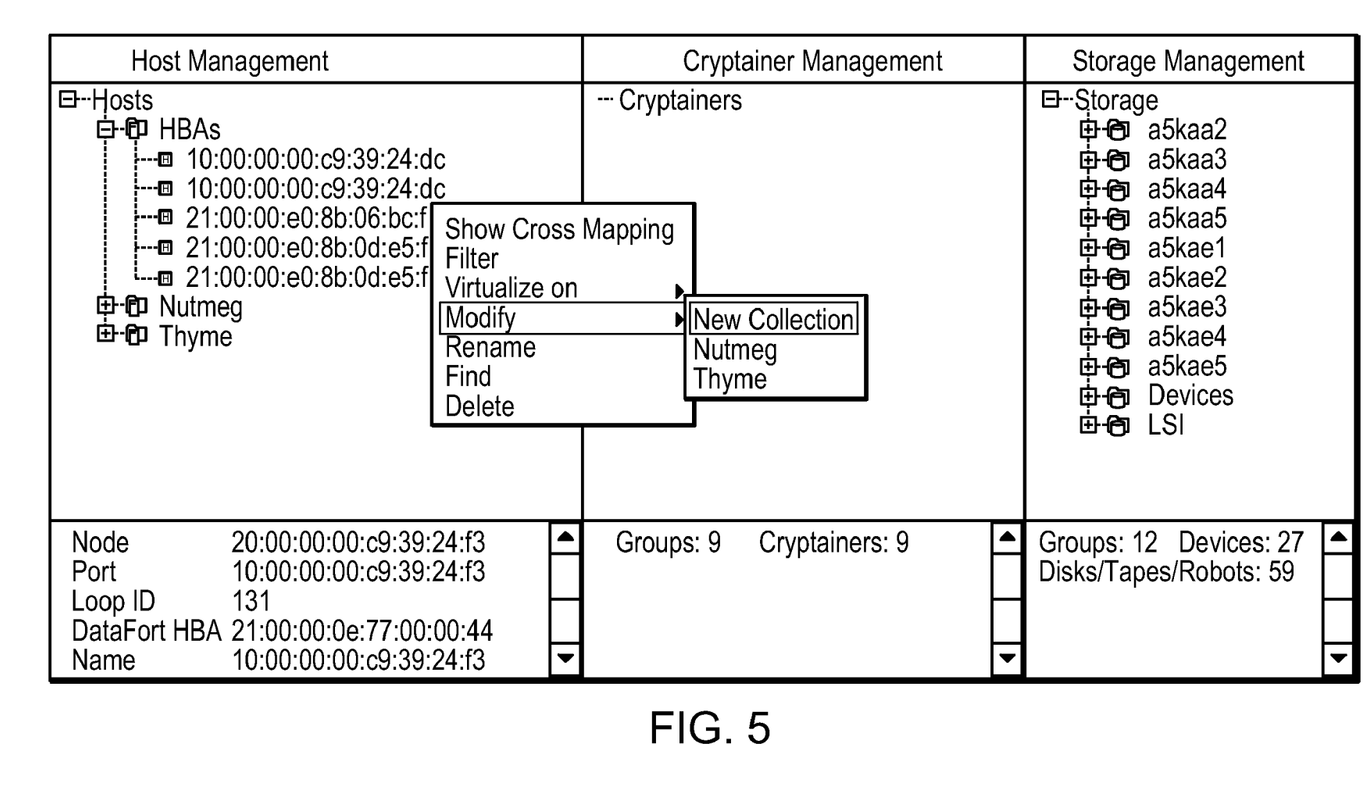
FIG. 5 is a screen shot of cross mapping in a graphical interface to show encryption relationships between hosts and storage devices or backup pools, showing a view of the host collection menu according to the invention.
Figure 6:
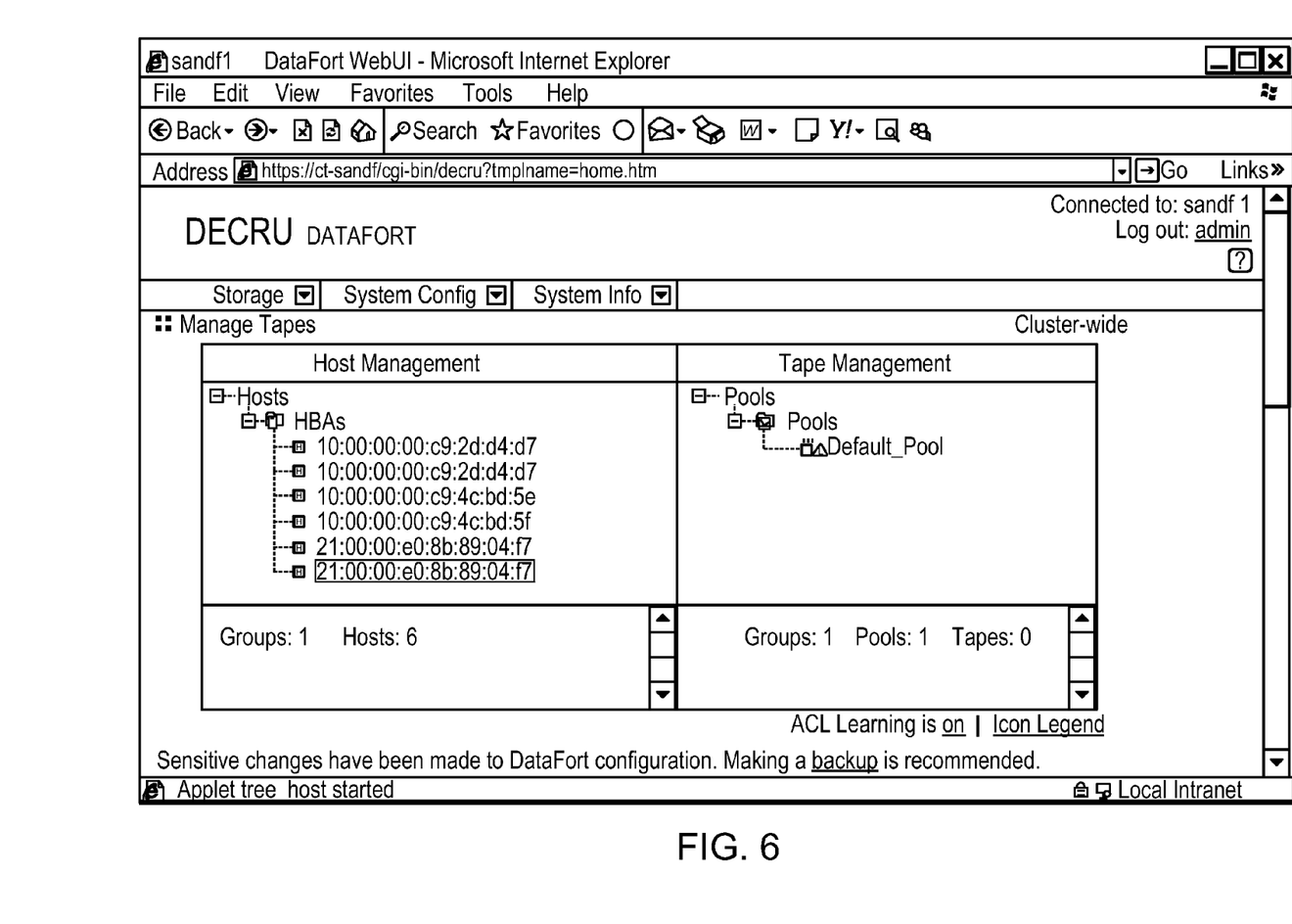
FIG. 6 is a screen shot of cross mapping in a graphical interface to show encryption relationships with regards to tape management according to the invention.

Right-click a host collection to view the host collection menu (FIG. 5). Use this menu to manage a collected host or group of hosts with the same access and configuration.

Show Cross Mapping. Right-click the collection and select Show Cross Mapping to view which secure storage compartments the collection can access, and the location of those secure storage compartments.

Filter. This option restricts the interface, such as a web browser graphical interface (WebUI), or the like, view to show only the secure storage compartments and storage devices the selected host collection can access. Virtualization. Some storage devices reserve space for a specific host as identified by its WWN. The storage security appliance presents host HBAs to storage, so some devices require that storage security appliance virtualize the host to make it possible for storage devices to see it. Right-click the collection and select Virtualization>On. The host is virtualized on available virtual ports.

Rename. To rename the collection, right-click it and select Rename. The name field opens in the lower pane. Enter the new name. To save the change, leave the cursor in the name field and hit Return on the Management Station keyboard.

Host Menu

Right-click a host to view the host menu (FIG. 5). Use this menu to manage individual paths from host to storage.

Advanced. Advanced>Set Default Pool: In a pool, storage devices are consolidated into a shared configuration, i.e. the pool. A typical backup environment includes backup pools to which hosts write backup tapes. If a host without access to any pool writes a backup tape, the storage security appliance creates a default pool for that host (host_wwn_Default_pool). For other hosts to write to the default pool, permission must be granted using the Tape Management features.

Advanced>Port Lock On/Off: Right-click the collection and select Advanced>Port Lock On to set the lock for the host. Port locking allows access to a secure storage compartment only from the HBA of the selected host. The port lock locks the host to a port on a switch. It must be turned off if the host is moved, and reset at the new port. Individual Host Icons show if port locking is on. The setting also appears in the lower pane.

Show Cross Mapping. Right-click a host and select Show Cross Mapping to view which secure storage compartments and targets the host can access.

Filter. Restricts the interface view to only the secure storage compartments and storage devices the selected host can access.

Virtualize. On some storage devices reserve space for a specific host as identified by its WWN. The storage security appliance presents host HBAs to storage, so some devices require that storage security appliance virtualize the host to make it possible for storage devices to see it. At the host level, it is possible to assign a specific virtual port for an HBA. Right-click the host and select Virtualize>On, then select a specific virtual port, or select Available Port to allow any available port to be assigned.

Move To. Move the selected host instance to a specified collection.

Rename. Select Rename. The name field opens in the lower pane. Enter the new name. To save the change, leave the cursor in the name field and hit Return on the Management Station keyboard.

Edit. Opens the Edit Host page where the Name, Label of Default Pool, Port Lock Mode and RAID administration mode can be set for the selected host.

Delete. Right-click the host and select Delete to remove it from the WebUI. This option removes the host from the WebUI. The host is not deleted from the fabric. If the host is still online and zoned with the storage security appliance, it reappears at the next rescan.

Secure Storage Compartment Management

The secure storage compartment Management pane of the WebUI features the following elements:

Secure Storage Compartment Collection Menu

Right-click a secure storage compartment collection to view the secure storage compartment collection menu (FIG. 2). Use this menu to manage collections of secure storage compartments.

Secure StorageCompartment Pane Menu. Right-click in the secure storage compartment pane to use the top level menu. The menu offers options to modify or refresh the pane view, add a new collection or filter the view to show only secure storage compartments and disks relevant to a specified storage security appliance.

Individual Secure Storage Compartment Menu

Right-click a secure storage compartment to view the secure storage compartment level menu (FIG. 2).

Individual secure storage compartment Icons. Icons identify the condition of the secure storage compartment. In an exemplary embodiment of the present invention, a red X indicates offline status, a yellow alert indicates a problem. Icons for secure storage compartments created on disk show whether the secure storage compartment has been encrypted or is in clear text form, is in the process of being encrypted, or is waiting for encryption, and whether the secure storage compartment is healthy or not. An unhealthy secure storage compartment is indicated if at least one device that maps to the secure storage compartment is offline.

Show Cross Mapping. Right-click a secure storage compartment collection and select Show Cross Mapping to view which hosts have access to the collection of secure storage compartments and to see on which storage device the secure storage compartments are located.

Host Access. Select a host in the host pane, then right-click a secure storage compartment collection and choose Host Access>Grant to grant that host access to the selected collection. To revoke host access, select the host then right-click the collection and select Host Access>Remove. Encryption Data within a secure storage compartment created on disk is not encrypted until the encryption process is begun using this option. Secure storage compartment icons indicate whether a secure storage compartment is already encrypted or if it is in cleartext, in the process of being encrypted, or waiting to be encrypted. If the disk contains data, select Encrypt/Resume Populated Disk. If the disk does not contain data, select Encrypt/Resume Empty Disk. Any data on the disk is lost. Select Decrypt to return the data to cleartext form. Use Pause/Cancel to halt the encryption process.

Cryptainer Menu

Right-click a secure storage compartment to view the secure storage compartment level menu (FIG. 2). Use this menu to manage individual secure storage compartments.

Rename. Select Rename. The name field opens in the lower pane. Enter the new name. To save the change, leave the cursor in the name field and hit Return on the Management Station keyboard.

Advanced. Advanced>Metadata (disk only): When a secure storage compartment is created for a LUN, it is assigned key material for encrypting and decrypting data stored there. This key material is the metadata of the secure storage compartment, which uniquely identifies the key associated with the LUN. This metadata are always stored in the configuration database of the storage security appliance, as well as with an LKM server if one is configured. Forcing metadata ON allows storage security appliance to write this metadata to a block of the LUN when a secure storage compartment is created, regardless of what is already on the disk. This can be useful when restoring data.

Show Cross Mapping. Right-click a secure storage compartment and select Show Cross Mapping to view which hosts have access to the secure storage compartment and to see on which storage device the secure storage compartment is located.

Host Access. Select a host in the host pane, then right-click a secure storage compartment and choose Host Access>Grant to grant that host access to the selected secure storage compartment. To revoke host access, select the host then right-click the secure storage compartment and select Host Access>Remove. Encryption Data within a secure storage compartment created on disk is encrypted until the encryption process is begun using this option. secure storage compartment icons indicate whether a secure storage compartment is already encrypted or if it is in cleartext, in the process of being encrypted or waiting to be encrypted. If the disk contains data, select Encrypt/Resume Populated Disk. If the disk does not contain data, select Encrypt/Resume Empty Disk. Any data on the disk is lost. Select Decrypt to return the data to cleartext form. Use Pause/Cancel to halt the encryption process. Note that this menu can also be used to rekey an existing secure storage compartment.

Move To. Move the selected secure storage compartment to a specified collection.

Rename. Select Rename. The name field opens in the lower pane. Enter the new name. To save the change, leave the cursor in the name field and hit Return on the Management Station keyboard.

Edit. Opens the Edit secure storage compartment page where the Name and Metadata settings can be changed for the selected secure storage compartment.

Storage Device Menu

Right-click a storage device to view the storage menu (FIGS. 3 and 4). Use this menu to manage storage devices.

LUN Menu

Expand a storage device view to see its LUNs (FIG. 3). Right-click a LUN to view the LUN menu. Use this menu to manage individual LUNs.

Create Secure Storage Compartments. Create a secure storage compartment on the device (a secure storage compartment per LUN for the entire device). Use Port Mapping if the LUN assignment structure must be consistent with the physical configuration of the device. Use LUN Mapping if the storage device is a multi-target device such as a JBOD.

Paths. Map/Unmap devices to add or remove a path from a secure storage compartment to a storage device. This feature is used when a secure storage compartment has been created without using collections (a single path to a storage device) and a second path to that secure storage compartment from the storage device needs to be created. Select the storage LUN that already has the secure storage compartment, then shift-click the LUN without the secure storage compartment and select Map to associate the secure storage compartment with that LUN. Select Unmap to remove this association.

Move to. Move the selected device to a specified collection.

Rename. Select Rename. The name field opens in the lower pane. Enter the new name. To save the change, leave the cursor in the name field and hit Return on the Management Station keyboard.

Disable. Disable causes the selected device to disappear from the storage panel. Disabled devices are grayed out and are not manageable from the WebUI. To restore disabled images, right-click in the white space and select Show/Hide Disabled.

Show Cross Mapping. Select the device and click Show Cross Mapping to display which hosts have access to which storage devices, and which storage devices secure storage compartments are mapped to.

Create Secure Storage Compartment. Create a Secure Storage Compartment on the LUN.

Paths. Select the storage device and choose Show Alternate Paths to view all paths to the device.

Map to. Secure Storage Compartment/Un-map from secure storage compartment allows you to add a path to a secure storage compartment or remove it. Map to secure storage compartment adds a path to a selected secure storage compartment on the LUN. Select the secure storage compartment, then shift-click the LUN and select Map to secure storage compartment.

Tape Menu

While tape devices are managed with the Storage>Manage Tapes page, there are right-click menu options for tape devices on the SAN Topology page. Expand a storage device view to see its tape devices (FIGS. 2 and 3). Right-click a device to view the tape menu.

Show Cross Mapping. Select the device and click Show Cross Mapping to display which hosts have access to which storage devices, and which storage devices secure storage compartments are mapped to.

Paths. Show Alternate Paths displays all mappings to the device. Select the storage device and choose Show Alternate Paths to view all paths to the device.

Map to. Secure storage compartment/Un-map from secure storage compartment allows a user to add a path to a secure storage compartment, or remove it. Map to secure storage compartment adds a path to a selected secure storage compartment on the LUN. Select the secure storage compartment, then shift-click the LUN and select Map to secure storage compartment.

Rename. Select Rename. The name field opens in the lower pane. Enter the new name. To save the change, leave the cursor in the name field and hit Return on the Management Station keyboard.

Delete. This option removes the storage device from the WebUI. Select the device and choose Delete. The device is not deleted from the fabric. If the device is still online and zoned with the storage security appliance, it reappears at the next rescan.

Restore Secure Storage Compartment. Restore secure storage compartment allows storage security appliance to restore a deleted secure storage compartment. Obtain the port and LUN information for the secure storage compartment to restore. Select the device onto which you wish to restore the secure storage compartment and choose Restore secure storage compartment. The Restore secure storage compartment page appears. Select the key (using the secure storage compartment Key ID information you have for the original secure storage compartment). Select Port or LUN Mapping and click Restore. This feature is preferably for disk use only.

Tape Pool Menu

Right-click a tape pool to view the tape pool menu. Use this menu to manage tape pools.

Show Cross Mapping. Right-click a tape pool and select Show Cross Mapping to view which hosts have access to the tape pool.

Host Access. Select a host in the host pane, then right-click a tape pool and choose Host Access>Grant to grant that host access to the selected pool. To revoke host access, select the host then right-click the pool and select Host Access>Remove.

Assign Key. A key is assigned to each media pool discovered by or assigned to storage security appliance. For pools, i.e. storage devices consolidated into a shared configuration, which encrypt per-pool, the key is used to encrypt any data assigned to the pool and is consistent throughout a single tape. For pools which encrypt per-tape, this key is not used for data encryption but rather as a placeholder to keep track of default key attributes for per-tape keys originating from this pool. Note that cleartext cannot be appended to ciphertext on an encrypted tape, nor can ciphertext be appended to a cleartext tape.

Manage. Key Import or export key assigned to tape pool.

Move To. Move the selected pool to a specified collection.

Edit. Opens the Edit Pool page where the Name, Key Policy and Key Export settings can be changed.

Delete Tapes. Right-click the pool and select Delete Tapes to remove the tapes associated with the pool from the WebUI, but leave the pool.

Delete. Right-click the pool and select Delete to remove it from the WebUI. All tapes must be deleted before the pool is removed.

Although the invention is described herein with reference to the preferred embodiment, one skilled in the art will readily appreciate that other applications may be substituted for those set forth herein without departing from the spirit and scope of the present invention.

For example, the invention is readily applicable to such other protocols as iSCSI, which also known as Internet SCSI (Small Computer System Interface), and which is an Internet Protocol (IP)-based storage networking standard for linking data storage facilities, developed by the Internet Engineering Task Force (IETF). By carrying SCSI commands over IP networks, iSCSI is used to facilitate data transfers over intranets and to manage storage over long distances.

Further, while cross mapping are permissions are taught herein to be implemented between a host connection and a secure storage compartment collection, as shown in FIGS. 2-6, the invention also extends cross mapping to all panels of a display, i.e. when a host collection is selected, a corresponding secure storage compartment collections is highlighted, and vice versa. Accordingly, the invention should only be limited by the Claims included below.

The invention claimed is:

1. A method for cross mapping a graphical user interface of a computer connected to a network to show encryption relationships between a plurality of hosts and a plurality of storage devices connected to the network, comprising:

displaying, at a single view on the graphical user interface executed by a processor operatively connected to the computer, the encryption relationships and access permissions between the plurality of hosts and the plurality of storage devices;

selecting through the graphical user interface a first host of the plurality of hosts from the displayed encryption relationships and access permissions;

in response to selecting the first host, displaying at the single view all secure storage compartments and corresponding logical unit numbers (LUNs) to which the first host has;

selecting through the graphical user interface a first secure storage compartment from the displayed encryption relationship and access permissions;

in response to selecting the first secure storage compartment, displaying at the single view each host that has access to the first secure storage compartment;

displaying cross mapping relationships between each host and the first storage compartments;

selecting through the graphical user interface a first (LUN) from the displayed encryption relationships and access permissions, wherein the first LUN corresponds to the first secure storage compartment; and in response to selecting the first LUN, displaying at the single view the first secure storage compartment to which the first LUN corresponds and each host that has access to the first LUN.

2. The method of claim 1, wherein the computer comprises a security appliance.

3. The method of claim 1, wherein the hosts comprise host groups and wherein the secure storage compartments comprise secure storage compartment groups, and wherein displaying comprises:

displaying the single view at a group level to show relationships between the host groups and the secure storage compartment groups.

4. The method of claim 1, further comprising:

retrieving from a storage security appliance information comprising a complete list of the hosts, the storage devices, and at least one key with regard to each secure storage compartments to display the single view.

5. The method of claim 4, further comprising:

overlaying a cross mapping of the encryption relationships at the single view in response to retrieving the information.

6. An apparatus for cross mapping a graphical user interface of a computer connected to a network to show encryption relationships between a plurality of hosts and a plurality of storage devices connected to the network, comprising:

means for displaying, at a single view on the graphical user interface executed by a processor operatively connected to the computer, the encryption relationships and access permissions between the plurality of hosts and the plurality of storage devices;

means for selecting through the graphical user interface a first host of the plurality of hosts from the displayed encryption relationships and access permissions;

means for displaying at the single view all secure storage compartments and corresponding logical unit numbers (LUNs) to which the first host has access in response to selecting the first host;

means for selecting through the graphical user interface a first secure storage compartment from the displayed encryption relationship and access permissions;

means for displaying at the single view each host that has access to the first secure storage compartment in response to selecting the first secure storage compartment;

means for displaying cross mapping relationships between each host and the first storage compartments;

means for selecting through the graphical user interface a LUN from the displayed encryption relationships and access permissions, wherein the first LUN corresponds to the first secure storage compartment; and means for displaying at the single view the first secure storage compartment to which the first LUN corresponds and each host that has access to the first LUN in response to selecting the first LUN.

7. The apparatus of claim 6, wherein the computer comprises a security appliance.

8. The apparatus of claim 6 wherein the hosts comprise host groups and wherein the secure storage compartments comprise secure storage compartment groups.

9. The apparatus of claim 6 wherein the hosts comprise host groups and wherein the secure storage compartments comprise secure storage compartment groups, and wherein displaying comprises:

means for displaying the single view at a group level to show relationships between the host groups and the secure storage compartment groups.

10. The apparatus of claim 6, further comprising:

means for retrieving from a storage security appliance information comprising a complete list of the hosts, the storage devices, and at least one key with regard to each secure storage compartments to display the single view.

11. The apparatus of claim 6, further comprising:

means for overlaying a cross mapping of the encryption relationships at the single view in response to retrieving the information.

* * * * *

UNITED STATES PATENT AND TRADEMARK OFFICE
CERTIFICATE OF CORRECTION

| | | |
|---|---|---|
| PATENT NO. | : 7,979,701 B1 | Page 1 of 1 |
| APPLICATION NO. | : 11/532480 | |
| DATED | : July 12, 2011 | |
| INVENTOR(S) | : Gandhasri | |

It is certified that error appears in the above-identified patent and that said Letters Patent is hereby corrected as shown below:

In Col. 10, line 27 should read as follows:
--host has access; --

In Col. 10, line 35 should read as follows:
and the first storage compartment In Col. 10, line 57 should read as follows:
storage compartment to display the single view In Col. 11, lines 19-21 should read as follows:
each host and the first storage compartment;
means for selecting through the graphical user interface a first
LUN from the displayed encryption relationships and In Col. 12, line 19 should read as follows:
secure storage compartment to display the single view.

Signed and Sealed this
Thirteenth Day of March, 2012

David J. Kappos
*Director of the United States Patent and Trademark Office*